United States Patent
Mehravaran et al.

(10) Patent No.: US 10,030,717 B2
(45) Date of Patent: Jul. 24, 2018

(54) LIQUID COOLED FAN CLUTCH

(71) Applicant: Ford Global Technologies, LLC, Dearborn, MI (US)

(72) Inventors: Meisam Mehravaran, Oak Park, MI (US); Gregory Bowlby, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 14/753,391

(22) Filed: Jun. 29, 2015

(65) Prior Publication Data
US 2016/0377127 A1 Dec. 29, 2016

(51) Int. Cl.
*F16D 35/02* (2006.01)

(52) U.S. Cl.
CPC ......... *F16D 35/028* (2013.01); *F16D 35/024* (2013.01); *F16D 35/027* (2013.01); *F16D 2300/0214* (2013.01)

(58) Field of Classification Search
CPC ...... F16D 35/00; F16D 35/027; F16D 35/028; F16D 35/024; F16D 2300/0214
See application file for complete search history.

(56) References Cited

U.S. PATENT DOCUMENTS

| | | |
|---|---|---|
| 3,559,786 A | 2/1971 | Long, Jr. |
| 4,007,819 A | 2/1977 | Maci |
| 4,627,523 A | 12/1986 | Light |
| 4,898,266 A * | 2/1990 | Garrett ............... F16D 37/008 192/21.5 |
| 5,134,975 A * | 8/1992 | Friedrichs ............ F01P 7/04 123/41.12 |
| 6,021,747 A * | 2/2000 | Gee ................... F16D 35/024 123/41.11 |
| 6,408,621 B1 | 6/2002 | Moser et al. |
| 7,178,656 B2 | 2/2007 | Pickelman et al. |
| 7,686,146 B2 | 3/2010 | Taylor |
| 8,851,028 B2 | 10/2014 | Pickelman, Jr. et al. |
| 2002/0121420 A1* | 9/2002 | Medamaranahally .. F16D 35/02 192/58.61 |
| 2014/0017091 A1* | 1/2014 | Tobergte ............ F04B 17/05 417/1 |
| 2014/0216881 A1* | 8/2014 | Tilly ................... F01P 5/043 192/48.2 |

FOREIGN PATENT DOCUMENTS

DE 4335342 A1 4/1995

* cited by examiner

*Primary Examiner* — Jacob S Scott
*Assistant Examiner* — Lillian T Nguyen
(74) *Attorney, Agent, or Firm* — James Dottavio; Brooks Kushman P.C.

(57) ABSTRACT

A liquid cooled viscous fan clutch transfers torque from a driving plate driven by an engine crankshaft to a driven plate connected to a cooling fan. Heat generated in a working fluid is transferred to a second fluid, such as engine coolant or transmission fluid, flowing through a cooling jacket. The cooling jacket is located in a stationary housing which may be fixed to the engine. The working fluid circulates through a working zone, a passageway in the stationary housing, and a passageway in the driving plate. Rotation of the driving plate provides the motive force to circulate the fluid, independent of the rotation speed of the driven plate. A controllable valve may be closed to block circulation, trapping working fluid in a reservoir, to disengage the clutch.

18 Claims, 4 Drawing Sheets

FIG. 1 – PRIOR ART

LIQUID COOLED FAN CLUTCH

TECHNICAL FIELD

This disclosure relates to the field of automotive fan clutches. More particularly, the disclosure pertains to a viscous fan clutch having a stationary housing and liquid cooling of the working fluid.

BACKGROUND

Many automotive engines are cooled with liquid coolant. The coolant absorbs heat while circulating within the engine and then transfers that heat to ambient air while circulating through a radiator. During operation in the most demanding operating conditions, an engine driven fan may be used to increase the flow of ambient air through the radiator. In less demanding conditions, it is desirable not to operate the fan to reduce the load on the engine. To achieve this intermittent fan operation, the engine crankshaft may drive the fan via either an actively controlled or thermostatically controlled fan clutch.

A fan clutch is illustrated in FIG. 1. Input shaft 10 is driven by the engine crankshaft either directly or via some power transfer mechanism such as an accessory drive belt. Output shaft 12 drives the fan. Input plate 14 is fixed to input shaft 10 while output plate 16 is fixed to output shaft 12 via a clutch cover 18. Ribs on input plate 14 are interspersed with ribs on output plate 16 such that the ribs are close to one another but do not touch. To engage the clutch, a working fluid is released from reservoir 20. As the fluid flows through the narrow gap between the ribs, viscous shear in the fluid exerts torque on the input plate and output plate. This narrow gap is called the working zone. The magnitude of the torque depends upon the relative speed between the plates and on the quantity of fluid in the working zone. When the fluid reaches the perimeter of the working zone, it is moving circumferentially. Some of the fluid enters return channel 22 in the clutch cover. If the output shaft is moving slower than the input shaft, then the fluid slows as it enters the return channel, causing an increase in pressure. When the speed difference between the input and output plates is sufficient, the increased pressure forces the fluid through return channel 22, against centrifugal force, back to reservoir 20. Thus, in the engaged state, fluid circulates continuously from the reservoir, through the working zone, through the return channel, and back to the reservoir. The output shaft speed stabilizes at a speed less than the input shaft speed.

To disengage the clutch, valve 24 is moved into a position in which it blocks the flow of fluid out of the reservoir 20. Once the fluid that was in the working zone exits the working zone, all torque transfer stops. Once the torque capacity is reduced, drag causes the fan to slow down. As the fan slows down, all of the fluid is returned to reservoir 20 through return channel 22. The position of valve 24 may be controlled via an actuator 26. For example, actuator 26 may be a stationary electro-magnetic actuator that pulls valve 24 into the engaged position shown in FIG. 1 by exerting a magnetic force. A return spring 28 pushes the valve into the disengaged position when the magnetic force is removed.

SUMMARY OF THE DISCLOSURE

A powertrain includes an engine, a cooling fan selectively driven by the engine via a viscous fan clutch, and a transmission. A working fluid circulates within the viscous clutch through a working zone between a drive plate and a driven plate. The drive plate and driven plate are supported in a stationary housing fixed to the engine. Liquid coolant, such as transmission fluid or engine coolant, may be routed through a coolant jacket in the clutch to remove heat generated by viscous shear and prevent the clutch from overheating. A valve may selectively block circulation of the working fluid to disengage the clutch.

A viscous fan clutch includes a drive plate fixed to an input shaft, a driven plate fixed to an output shaft, and a stationary housing. A plurality of cylindrical ridges on the drive plate are interspersed with a plurality of cylindrical ridges on the driven plate to define a working zone. Viscous shear in a working fluid flowing through the working zone transfers torque from the drive plate to the driven plate. A passageway in the drive plate connects an inlet port to an outlet port radially inside the working zone. A second passageway in the stationary housing connects an inlet port located radially outside the working zone to an outlet port adjacent to the inlet port of the first passageway. Rotation of the drive plate propels the working fluid through the first passageway, working zone, and then through the second passageway. The stationary housing may further define a coolant jacket proximate to the second passageway to provide heat transfer from the working fluid to a coolant flowing through the coolant jacket.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 2:
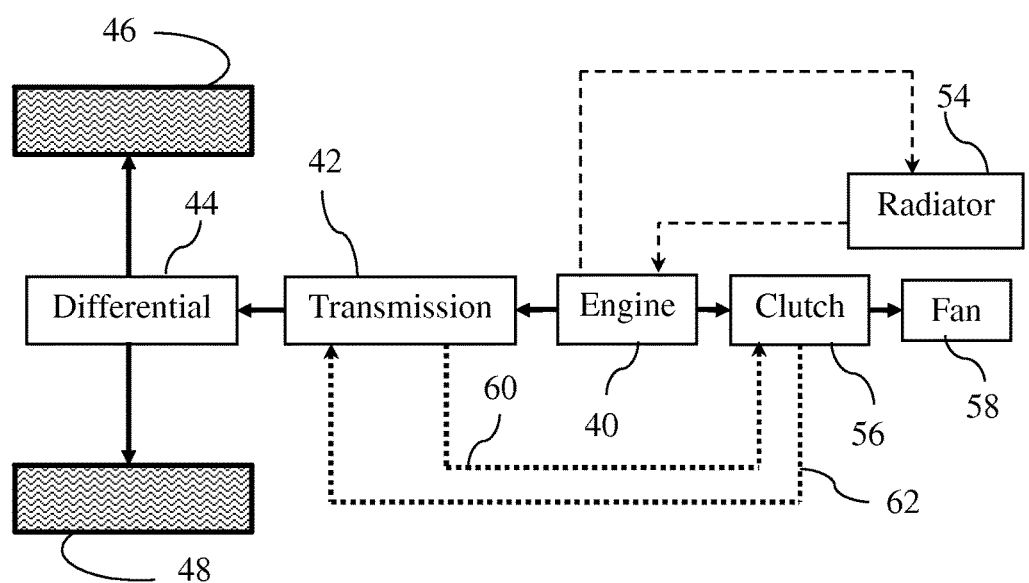
FIG. 2 is a schematic diagram of a vehicle powertrain including a fan clutch cooled with transmission fluid.

FIG. 2 schematically illustrates a vehicle powertrain. The flow of mechanical power is illustrated by solid lines. Dashed lines indicate the flow of engine coolant while dotted lines indicate flow of transmission fluid. Engine 40 generates power to turn a crankshaft by burning fuel. A transmission 42 conditions the mechanical power by adjusting the speed and torque based on current vehicle needs. At low speed, transmission 42 reduces the speed and multiplies the torque to improve performance. At higher speed, transmission 42 increases the speed such that the engine can run at an efficient crankshaft speed. Differential 44 divides the power between left and right drive wheels 46 and 48 while permitting slight speed differences as the vehicle turns.

Heat is removed from the engine by circulating engine coolant through the engine block and through radiator 54. A thermostatic valve shuts off circulation through the radiator whenever the engine coolant is below a desired operating temperature. The engine coolant may also circulate through a heat exchanger called a heater core when cabin heat is requested. To control the temperature of the transmission fluid, the transmission fluid may be circulated through radiator 54 (although separated from engine coolant) or may be circulated through a liquid to liquid heat exchanger to transfer heat to engine coolant. Both the engine and the transmission operate less efficiently when the temperature is below the normal operating temperature, so warming up quickly to the normal operating temperature is desirable. During heavy load operating conditions, such as towing a trailer up an incline, the natural flow of ambient air through radiator 54 may be insufficient to control the temperature of the engine coolant. In these conditions, clutch 56 may engaged to drive fan 58 to increase the flow rate of ambient air through radiator 54. When clutch 56 is fully or partially engaged, some of the engine power is diverted to the fan as opposed to propelling the vehicle, reducing vehicle performance. Therefore, it is desirable to engage clutch 56 only when necessary and only to the degree necessary.

Figure 1:
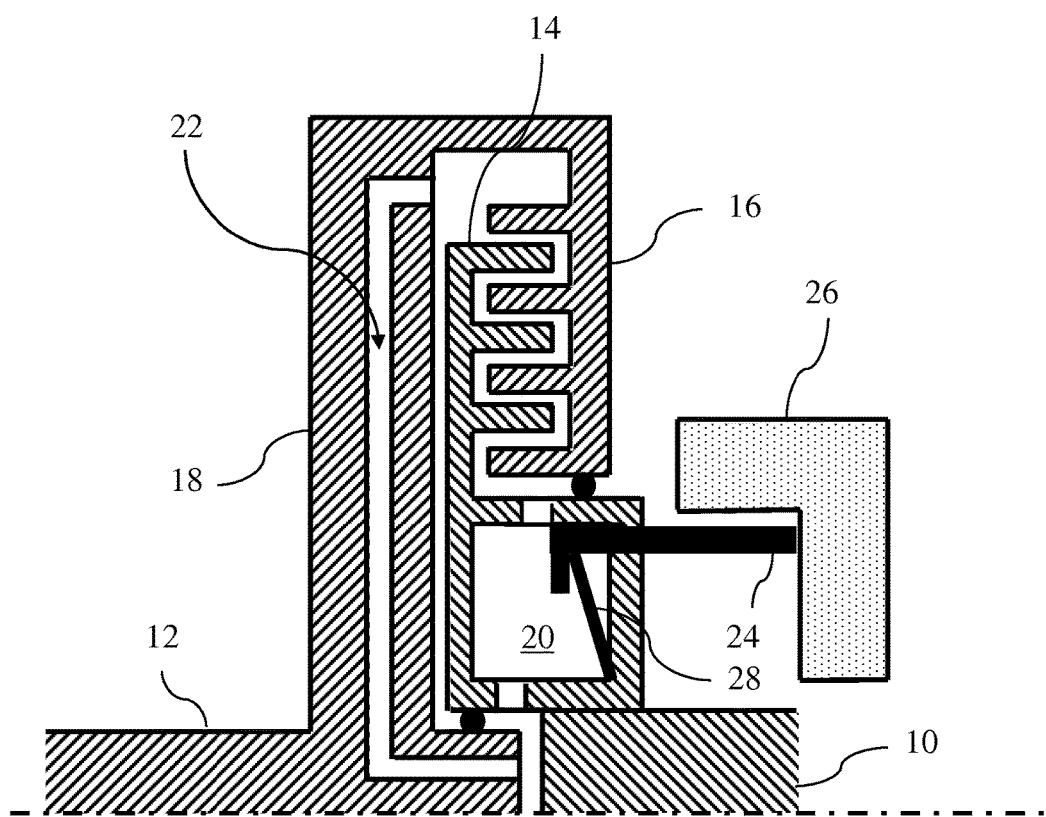
FIG. 1 is a cross sectional diagram of a prior art viscous fan clutch.

When a viscous fan clutch is transferring torque, heat is generated in the working fluid. The rate of heat generation is proportional to the torque and also proportional to the speed difference between the input shaft and the output shaft. In the prior art fan clutch of FIG. 1, the only significant mechanism for dissipating this heat is via convection to ambient air through either output plate 16 or cover 18. Even when these parts are designed with fins to facilitate convection, the heat dissipation capability is limited. Consequently, the clutch must be carefully controlled to avoid operation with combinations of speeds and torque capacity that would generate excessive heat in the working fluid. When the engine speed is high, the clutch must either be disengaged to reduce the torque or engaged sufficiently to reduce the speed difference. Operation at intermediate torque capacities with substantial slip must be avoided. This limits the control system's ability to set the fan speed to the optimum level to provide adequate engine cooling with minimum parasitic loss. In the prior art clutch of FIG. 1, the motive force circulating the working fluid is based on a speed difference between the driving plate and the driven plate. Therefore, some degree of slip is required in order to maintain working fluid circulation though the working zone to maintain torque capacity.

Figure 3:
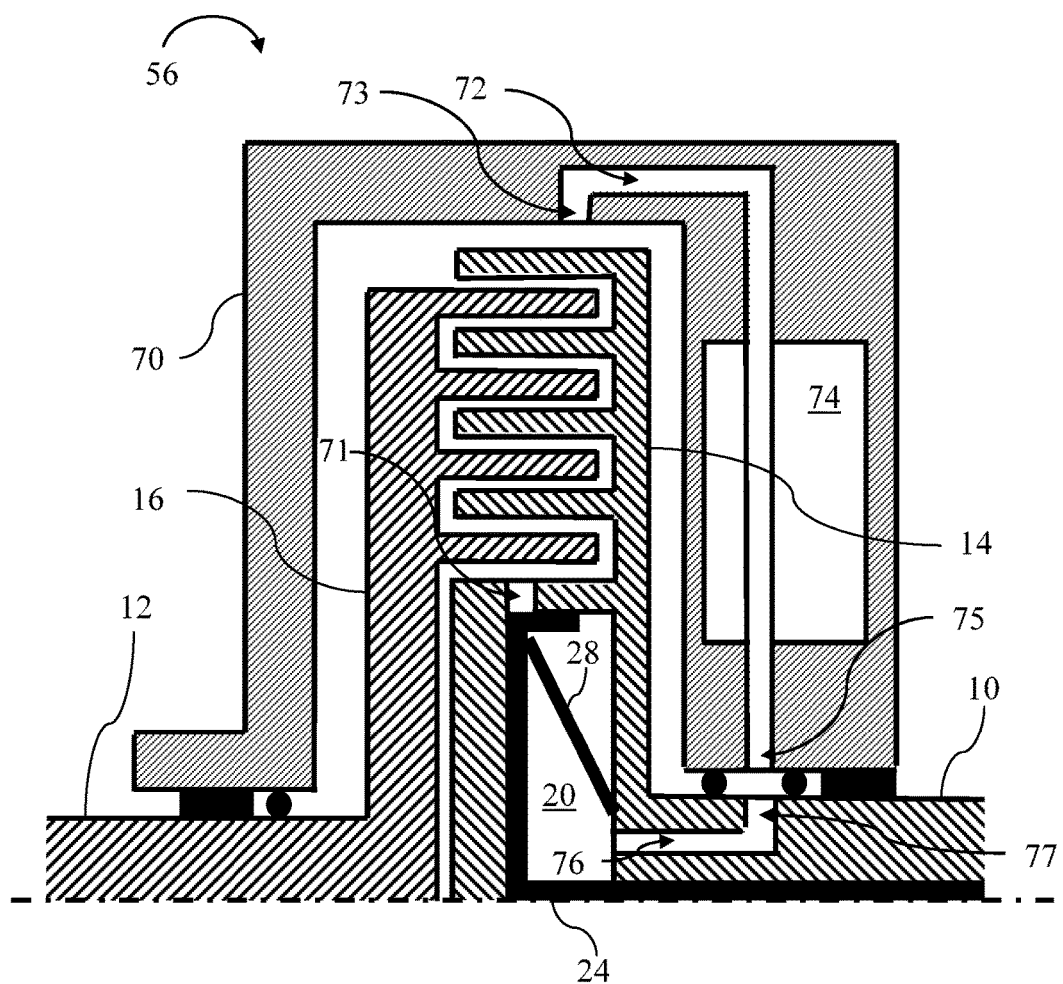
FIG. 3 is a cross sectional diagram of a first embodiment of a liquid cooled fan clutch suitable for use in the powertrain of FIG. 2.
Figure 4:
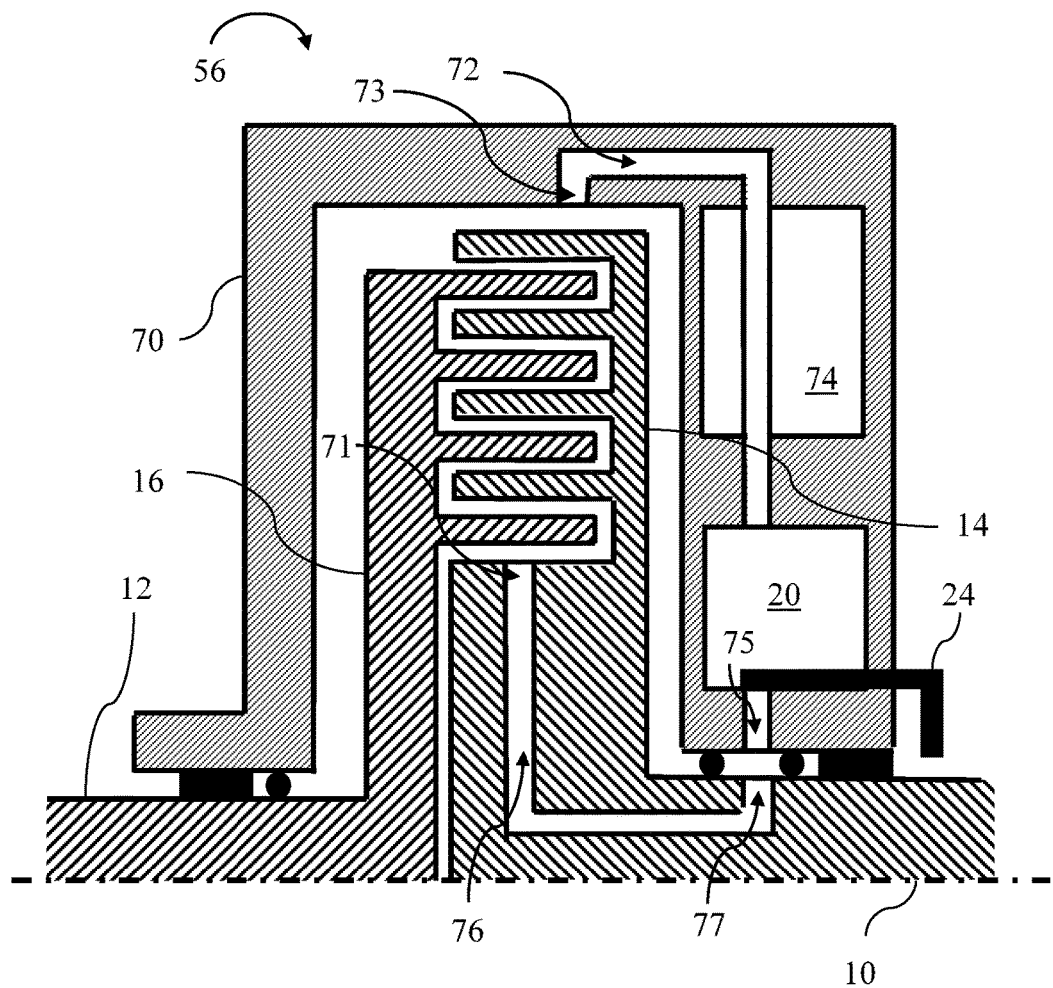
FIG. 4 is a cross sectional diagram of a second embodiment of a liquid cooled fan clutch suitable for use in the powertrain of FIG. 2.

Fan clutch 56 of FIG. 2 provides an additional heat dissipation mechanism by routing transmission fluid from the transmission to the clutch via circuit 60 and then back to the transmission via circuit 62. FIGS. 3 and 4 show alternative fan clutches configured to transfer heat from the working fluid to the transmission fluid. Each of these embodiments include a stationary clutch housing through which both the working fluid and the transmission fluid flow, providing an opportunity for heat transfer. In alternative embodiments, engine coolant may be routed through clutch 56 as opposed to transmission fluid.

A viscous fan clutch 56 with a stationary housing 70 and liquid cooling is illustrated in FIG. 3. Input shaft 10 and output shaft 12 are both supported for rotation by bearings. Input shaft 10 is driven by the engine crankshaft either directly or via some power transfer mechanism such as an accessory drive belt. Output shaft 12 drives the fan. Input plate 14 is fixed to input shaft 10 while output plate 16 is fixed to output shaft 12. Ribs on input plate 14 are interspersed with ribs on output plate 16 such that the ribs are close to one another but do not touch. To engage the clutch, a working fluid is released from reservoir 20 via outlet 71. As the fluid flows through the narrow gap between the ribs, viscous shear in the fluid exerts torque on the input plate and output plate. The magnitude of the torque depends upon the relative speed between the plates and on the quantity of fluid in the working zone. When the fluid reaches the perimeter of the working zone, the input and output plates propel the fluid circumferentially around the interior of housing 70. The fluid enters return channel 72 at return channel inlet 73 near the top of the housing 70. Gravity causes the fluid to travel through return channel 72 back to return channel outlet 75 towards the rotational axis. Momentum of the fluid imparted by the input plate also propels the fluid through return channel 72. This mechanism of circulating the working fluid does not rely on slip between the input shaft and output shaft. Since the housing 70 is not rotating, it is not necessary to overcome centrifugal forces to return the working fluid to reservoir 20. From return channel 72, the fluid flows through a gap between housing 70 and input shaft 10 into input shaft channel inlet 77 of feed channel 76 which returns the fluid to reservoir 20. Seals define the gap between housing 70 and input shaft 10 and direct the flow into the input shaft channel. Thus, in the engaged state, fluid circulates continuously from the reservoir, through the working zone, through the return channel, and back to the reservoir. As the output shaft speed approaches the input shaft speed, the torque capacity decreases due to reduced shear rate in the working zone. However, the quantity of working fluid in the working zone does not decrease. The output shaft speed stabilizes at a speed slightly less than the input shaft speed.

A coolant jacket 74 is formed into housing 70. Transmission fluid is routed from circuit 60 through coolant jacket 74 and then back to the circuit 62. Alternatively, engine coolant may be circulated through the coolant jacket. Return channel 70 is routed through coolant jacket 74 to provide opportunity for efficient heat transfer. Although only a single, straight path is shown, return channel 70 may divide into multiple paths which may take a circuitous route through the coolant jacket to maximize the surface area available for heat transfer.

To disengage the clutch, valve 24 is moved into a position in which it blocks the flow of fluid out of the reservoir 20. Once the fluid that was in the working zone exits the working zone, all torque transfer stops. The position of valve 24 may be controlled by a stationary electro-magnetic actuator in stationary housing 70 that pulls valve 24 into the engaged position by exerting a magnetic force. A return spring 28 pushes the valve into the disengaged position shown in FIG. 3 when the magnetic force is removed.

A second viscous fan clutch 56 with liquid cooling is shown in FIG. 4. In this embodiment, reservoir 20 is in the stationary housing 70 as opposed to the rotating input shaft 10. Since valve 24 is not in a rotating component, the actuator can be simplified. When the valve is open, gravity causes the working fluid to flow into feed channel 76 in input shaft 10 to engage the clutch. Scavenging of the fluid back to reservoir 20 and transfer of heat to cooling jacket 74 is accomplished as in the embodiment of FIG. 3.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A viscous fan clutch comprising:
   input and output shafts;
   a drive plate fixed to the input shaft and having a first plurality of cylindrical ridges, the drive plate and input shaft defining a first fluid passageway from a first inlet port to a first outlet port located radially inside an innermost ridge of the first plurality of ridges;
   a driven plate fixed to the output shaft and having a second plurality of cylindrical ridges interspersed with the first plurality of ridges such that viscous shear acting on a working fluid between the first and second pluralities of ridges exerts torque on the driven plate; and
   a stationary housing defining a second fluid passageway from a second inlet port located radially outside the first outlet port to a second outlet port adjacent to the first inlet port such that rotation of the drive plate and driven plate relative to the housing propels the working fluid through the first passageway, between the first and second pluralities of ridges, and through the second passageway.

2. The viscous fan clutch of claim 1 wherein the stationary housing further defines a coolant jacket proximate to the second passageway to provide heat transfer from the working fluid to coolant in the coolant jacket.

3. The viscous clutch of claim 1 wherein the first passageway includes a fluid reservoir.

4. The viscous clutch of claim 3 further comprising a valve configured to selectively block the first passageway such that fluid is retained in the reservoir.

5. The viscous fan clutch of claim 4 further comprising an electro-magnetic actuator fixed to the stationary housing and configured to bias the valve in a first axial direction.

6. The viscous fan clutch of claim 5 further comprising a return spring configured to bias the valve in a second axial direction opposite the first axial direction.

7. The viscous fan clutch of claim 6 wherein the electro-magnetic actuator acts to open the valve to engage the clutch and the return spring acts to close the valve to disengage the clutch.

8. A clutch comprising:
   a housing defining a passageway;
   a driven plate supported within the housing for rotation relative to the housing;
   a driving plate supported within the housing for rotation relative to the housing in proximity to the driven plate to define a working zone, the driving plate configured to circulate a working fluid through the working zone and the passageway; and
   a valve configured to selectively block flow of the working fluid;
   wherein the passageway runs from an inlet port radially outside the working zone, through the housing, across a gap between the housing and the driven plate, through the driven plate, to an outlet port radially inside the working zone.

9. The clutch of claim 8 wherein the housing further defines a coolant jacket such that heat is transferred from the working fluid to a coolant flowing through the coolant jacket.

10. The clutch of claim 8 wherein the passageway includes a fluid reservoir.

11. The clutch of claim 10 wherein the fluid reservoir is located within the drive plate.

12. The clutch of claim 10 wherein the valve is configured to selectively block the passageway such that fluid is retained in the reservoir.

13. The clutch of claim 12 further comprising an electro-magnetic actuator fixed to the housing and configured to bias the valve in a first direction.

14. The clutch of claim 13 further comprising a return spring configured to bias the valve in a second direction opposite the first direction.

15. The clutch of claim 14 wherein the electro-magnetic actuator acts to open the valve to engage the clutch and the return spring acts to close the valve to disengage the clutch.

16. A powertrain comprising:
   an engine having a crankshaft and an accessory drive shaft driven by the crankshaft;
   a cooling fan;
   a viscous clutch configured to selectively transfer torque from the accessory drive shaft to the cooling fan, the viscous clutch having a housing fixed to the engine and defining a cooling jacket;
   a transmission driven by the crankshaft; and
   plumbing configured to route transmission fluid from the transmission through the viscous clutch.

17. The powertrain of claim 16 wherein the viscous clutch further comprises:
   a driven plate driveably connected to the cooling fan and supported for rotation within the housing; and
   a driving plate driveably connected to the crankshaft and supported for rotation within the housing in proximity to the driven plate to define a working zone, the driving plate configured to circulate a working fluid through the working zone and through a heat exchange interface with the transmission fluid.

18. The powertrain of claim 17 further comprising a valve configured to selectively block flow of the working fluid to disengage the clutch.

* * * * *